United States Patent
Rudolph et al.

(10) Patent No.: US 6,891,115 B2
(45) Date of Patent: May 10, 2005

(54) STEERING COLUMN SWITCH

(75) Inventors: Gerd Rudolph, Aspisheim (DE); Holger Besier, Oestrich-Winkel (DE)

(73) Assignee: Delphi Technologies, Inc., Troy, MI (US)

( * ) Notice: Subject to any disclaimer, the term of this patent is extended or adjusted under 35 U.S.C. 154(b) by 41 days.

(21) Appl. No.: 10/148,839

(22) PCT Filed: Dec. 1, 2000

(86) PCT No.: PCT/DE00/04307
§ 371 (c)(1),
(2), (4) Date: Sep. 27, 2002

(87) PCT Pub. No.: WO01/40020
PCT Pub. Date: Jun. 7, 2001

(65) Prior Publication Data
US 2003/0136655 A1 Jul. 24, 2003

(30) Foreign Application Priority Data
Dec. 4, 1999 (DE) .......................... 199 58 507

(51) Int. Cl.[7] .................................. H01H 9/00
(52) U.S. Cl. .................................. 200/61.54
(58) Field of Search ................ 200/4, 17 R, 61.27, 200/61.3, 61.54, 335

(56) References Cited

U.S. PATENT DOCUMENTS

| 4,739,130 | A | * | 4/1988 | Roller et al. | 200/61.27 |
|---|---|---|---|---|---|
| 5,859,396 | A | * | 1/1999 | Yokoyama | 200/61.54 |
| 6,365,852 | B1 | | 4/2002 | Leng et al. | |
| 6,399,905 | B1 | * | 6/2002 | Nishikawa et al. | 200/61.54 |
| 6,472,622 | B1 | | 10/2002 | Besier | |
| 6,492,744 | B1 | | 12/2002 | Rudolph et al. | |

FOREIGN PATENT DOCUMENTS

| DE | 2810790 | 9/1979 |
|---|---|---|
| DE | 4332748 | 3/1995 |
| DE | 4428883 | 12/1995 |
| EP | 0845389 | 6/1998 |
| EP | 0861753 | 9/1998 |
| FR | 2749240 | 12/1997 |

* cited by examiner

Primary Examiner—Michael A. Friedhofer
(74) Attorney, Agent, or Firm—David P. Wood

(57) ABSTRACT

A steering column switch having a switch element and a switch lever, wherein the switch lever is designed from first and second modules. Because of the modular design, different grip pieces can be accommodated by the same switch element.

16 Claims, 3 Drawing Sheets

STEERING COLUMN SWITCH

TECHNICAL FIELD

The invention generally relates to electrical switches and more particularly relates to steering column switches of a vehicle.

BACKGROUND OF THE INVENTION

EP-A-0 845 389 discloses a steering column switch with a housing, in which at least one operating lever is mounted to pivot and/or move, for which different types of operating levers with the corresponding contact device can be used during assembly. A mating contact device with a predefined number of switch functions that cooperates with the contact device of the operating lever is arranged in the housing of the steering column switch. The available choice of switch functions is a function of the type of operating lever to be installed and its contact device.

DE-A-43 32 748 also shows a steering column switch with a switch lever mounted to move, at least in one plane relative to the steering column, in a housing, which is in connection with switch elements arranged on a printed-circuit board for its activation. At least one of its switch elements is designed as a light-transmitting or light-receiving element in optical connection with a corresponding optical switch, operable by the switch lever.

DE 44 28 883 C1 discloses a steering column switch with a housing having mounts for single switches. The single switches comprise a switch housing, in which a switch lever is mounted to pivot. Guide elements are molded onto the switch housing for alignment in the correct position and holding in a mounting chamber of the housing. The switch housing also has clip elements for fastening of the switch in the corresponding mounting chambers. The switch is provided with function elements and is equipped with a printed-circuit board that is connected to a central circuit board of the steering column switch.

Steering column switches are also known, whose switches, integrated in a switch lever, are connected by corresponding wiring to a circuit board of the steering column switch, on which the switch lever is mounted in a two-part housing of the steering column switch, whose separation runs in the region of the switch lever. This type of switch lever must have corresponding free space available in its interior, in order to permit passage of the wiring, which requires relatively large dimensioning of the switch lever. Significant assembly expense is required for wiring within the switch lever, as well as from the switch lever to the corresponding circuit board. The steering column switches are pre-mounted together with the corresponding switch lever and then installed in the vehicle, so that a significant risk of damage to the switch lever exists during handling of the steering column switches.

The object of the invention is to devise a steering column switch of the initially mentioned type, which has various applications, in terms of functions, is inexpensive to manufacture and easy to handle during assembly.

The objective is realized according to the invention in that the switch lever is assembled from a foot cooperating with the switch element and a grip piece inserted into the foot.

Because of the two-part design of the switch lever, the switch mechanics of the steering column switch can be made cost effectively in a large number of pieces, regardless of its switching functions. Coordination of the switching functions to the steering column switch, provided with a central printed-circuit board, occurs by means of corresponding programming of the computer system of the vehicle. More specifically, the switch lever (grip piece) is coupled to the foot of the switch lever. Insertion of the grip piece into the foot can occur at the end of assembly of the steering column switch in the vehicle, for which reason the grip piece is only exposed to limited risk of damage during assembly. In addition, the arrangement of a one-part housing for the steering column switch is possible, which need only be provided with a corresponding opening for the grip piece. A visually pleasing effect is achieved with the one-part housing.

In a steering column switch of the initially mentioned type, with at least one additional switch integrated in the switch lever of the single switch, the objective according to the invention is realized in that the switch lever is assembled from a foot cooperating with the switch element and a grip piece inserted into the foot, wherein the end of the grip piece inserted into the foot has contact traces, which transmit the functions of the switch to the terminal contacts via a contact unit.

Because of these advantages, prefabrication of the switch mechanism of the steering column switch, together with the contact unit and the foot of the switch lever, is ensured in a relatively large number of pieces. Different grip pieces, insertable into the foot of the switch lever, each can be equipped with at least one arbitrarily designed switch. For example, a switch for interval functions of the windshield wiper is connected to the grip piece for a windshield wiper/washer switch. In addition or as an alternative, a switch to control a computer system is provided, in which the switch or switches cooperate with the contact traces integrated in the grip piece, and the electrical connection to the terminal contacts for the switch or switches is achieved by simple insertion of the grip piece into the foot over the contact unit.

In order to achieve rapid, permanent assembly, and also several degrees of freedom of the switch lever, the foot of the switch lever is preferably mounted as a swivel joint and provided with two opposite clip arms that engage in corresponding clip openings of the grip piece.

For simple swivel mounting of the switch lever and to achieve switching functions, the foot of the switch lever is expediently mounted to pivot in an opening of an arm of an L-shaped rotary switch element, where the rotary switch element is inserted into an arm of a Z-shaped support fixed to the housing. Arrangement of additional mounts with a switch lever therefore is unnecessary, since corresponding support sites are integrated in the rotary switch element.

The arm of the rotary switch element running parallel to the connector of the support is preferably provided with a terminating locating curved element that cooperates with a spring-loaded locating sleeve in the arm of the support facing the end of the rotary switch element. Thus, an initial position of the swivel-mounted switch lever is defined and a desired switching sensation is created during its operation. The arm of the support carrying the locating sleeve for the rotary switching element expediently comprises an additional spring-loaded locating sleeve that cooperates with a locating curve in the free end of the foot. Thus, the switch lever is held in a certain initial position. Pivoting of the switch lever from the initial position occurs against the spring force, to which the locating sleeve is exposed, so that a corresponding switch sensation is produced.

According to an advantageous modification of the invention, the arm of the support carrying the locating sleeves supports a sliding switch element, acted upon by the foot of the switch lever. The support therefore represents an essential component to accommodate the sliding switch element, as well as the rotary switch element, and forms a separate assembly with the connected switch element, which is simple to install and replace.

The switch contacts of the rotary switch element and the sliding switch element are expediently designed as contact springs and act on corresponding contact traces of the support that are connected to the terminal contacts. The contact springs are components of a punched grid inserted into the rotary switch element and the sliding switch element, which is simultaneously injection molded during production of the switch elements in the injection molding process, so that an additional assembly step can be eliminated. In order to avoid damage to the grip piece and the foot during assembly, the grip piece has a centering shoulder on the end inserted into the foot, which engages in a corresponding centering hole of the foot.

According to an advantageous embodiment of the concept of the invention, the contact traces of the grip piece are exposed regions of a punched grid integrated in the grip piece connected to the switch. Relatively costly wiring of the switch with the contact traces is therefore eliminated and a number of switching functions to be transmitted are possible by appropriate coding of the punched grid introduced to the grip piece.

In order to produce a cost-effective contact unit having relatively high functional safety and that ensures tolerance and movement compensation, the contact unit preferably has contact arms designed as leaf springs, where one end of each contact arm is connected to the corresponding contact trace of the punched grid of the grip piece and the other end of the contact arm is connected to a corresponding contact trace of the support. The contact arms of the contact unit that act on the contact traces of the support extend through a recess of the rotary switch element mounted in the support.

According to a modification of the invention, the contact unit has limiting arms on the side that extend essentially parallel to the contact arms. Each arm of the contact unit has a cylindrical shoulder on the end, where the opposite shoulders on one end of the contact unit engage in a corresponding recess of the rotary switch element and the shoulders on the other end of the contact unit engage in a corresponding recess of the foot. The contact unit therefore represents a compact assembly that can be fixed relatively simply between the rotary switch unit and the foot.

The recesses in the rotary switch element, in which the shoulders of the arm of the contact unit engage, are, advantageously, cylindrical holes. The recesses in the foot of the switch lever, into which the shoulders of the arm of the contact unit engage, are also elongated holes. In this way, a compensatory movement of the contact unit is guaranteed during the pivoting of the switch lever to act on the sliding switch element. The sliding of the contact arms of the contact unit on the corresponding contact traces of the grip piece and the contact traces of the support effects the self-cleaning of the support.

It is understood that the aforementioned features and those still to be explained can be used not only in the stated combination, but also in other combinations without departing from the scope of the present invention.

DETAILED DESCRIPTION OF THE PREFERRED EMBODIMENTS

Figure 1:
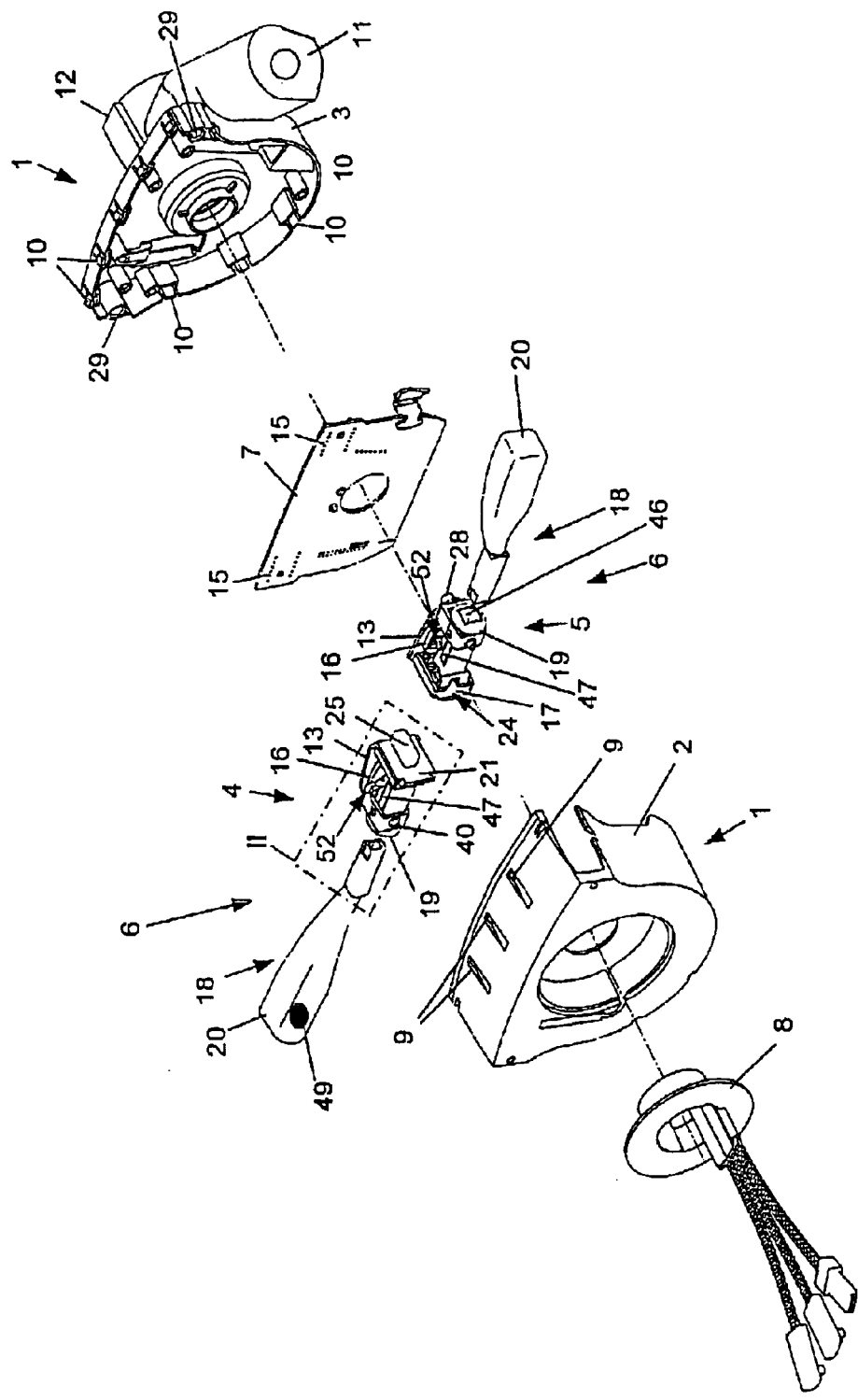
FIG. 1 shows an exploded view of a steering column switch according to the invention.
Figure 2:
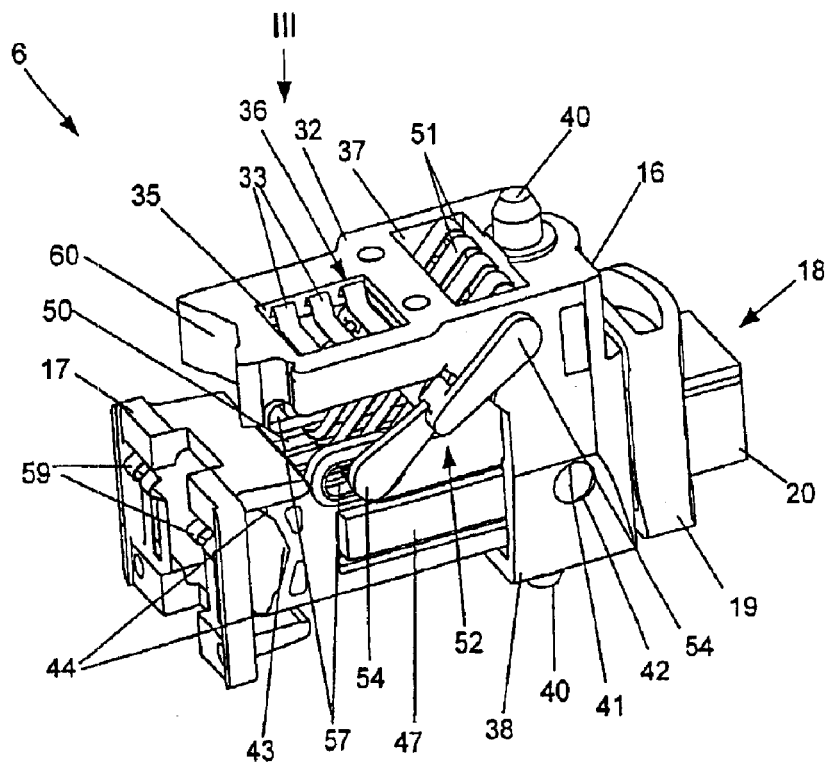
FIG. 2 shows an enlarged view of a detail II according to FIG. 1.
Figure 3:
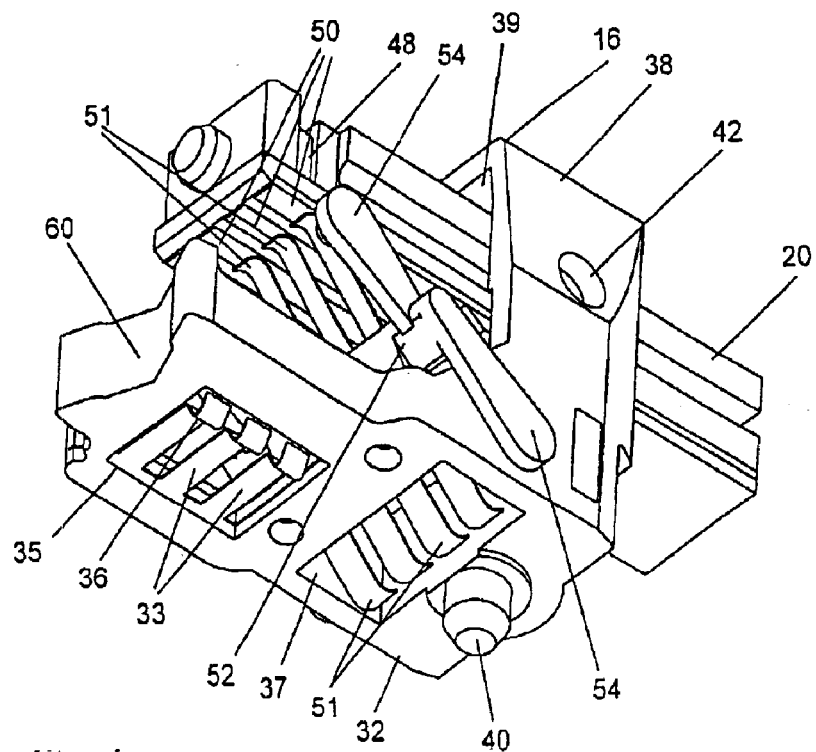
FIG. 3 shows a view in the direction of arrow III according to FIG. 2.
Figure 4:
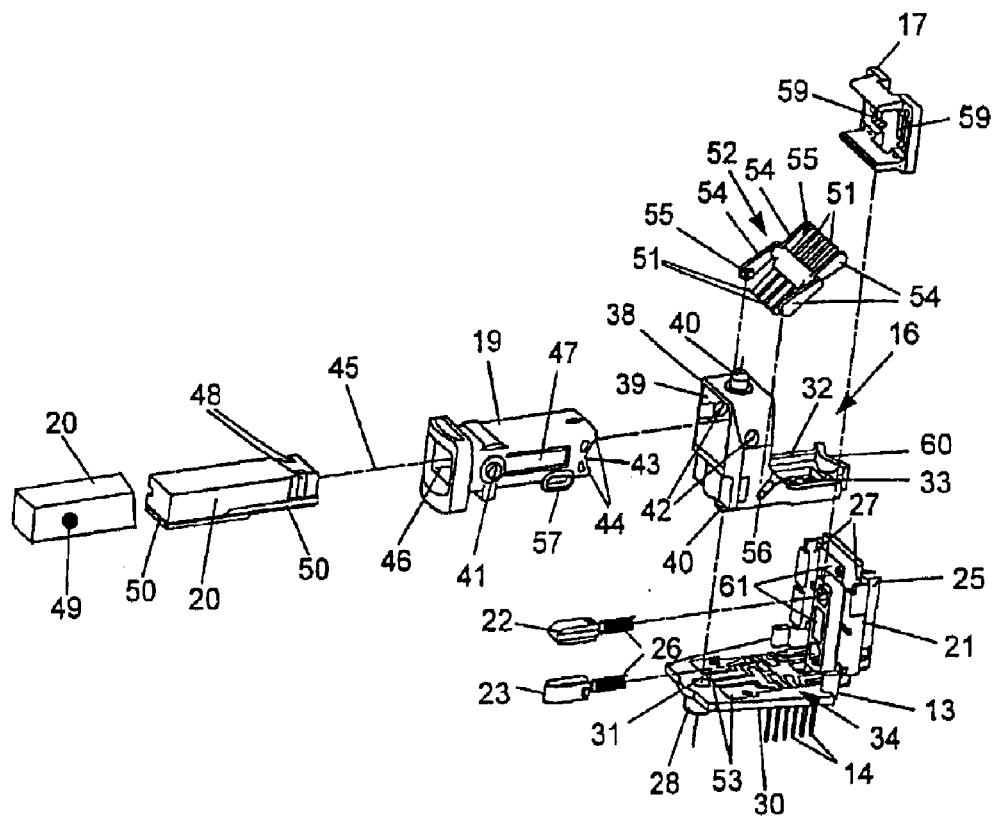
FIG. 4 shows an exploded view of a detail II according to FIG. 1.
Figure 5:
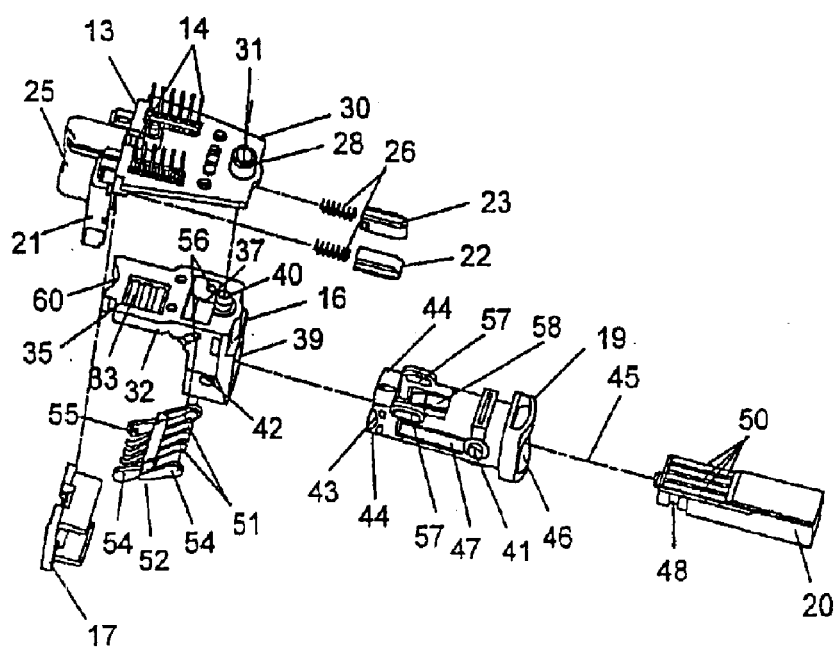
FIG. 5 shows another exploded view of a detail II according to FIG. 1.

Now referring to FIG. 1, the steering column switch comprises a housing 1 that consists of a cover 2 and a support module 3, and an individual switch 6 designed as a blinker switch 4 and a wiper/washer switch 5, as well as a circuit board 7. On the side facing the steering wheel (not shown), a transfer element 8 to control the functions of an airbag in cover 2 of housing 1 is inserted, which is connected to circuit board 7. The cover 2 is provided with clip openings 9 on its periphery that engage with corresponding clip arms 10 of support module 3. The support module 3 also contains a mount 11 for an ignition key and a fastening device 12 to attach the steering column switch to a jacket tube of a steering column of the vehicle.

The blinker switch 4 and the wiper/washer switch 5 are designed identically, and each consists essentially of a support 13 with terminal contacts 14 that engage in corresponding holes 15 of circuit board 7, a rotary 16 and sliding switch element 17 and a swivel-mounted switch lever 18. The switch lever 18 is designed in two parts and consists of a foot 19 and a grip piece 20.

The support 13 is designed essentially Z-shaped and holds, in the arm 21 facing switch lever 18, two superimposed, spring-loaded, locating sleeves 22, 23 in the center, which are components of the locating elements 24 of the corresponding single switch 6. For this purpose, a dome 25 is molded onto the arm 21 of support 13, into which corresponding compression springs 26 are inserted that act on locating sleeves 22, 23. The arm 21 also has opposite grooves 27 to guide the sliding switch element 17, as well as contact traces 61.

The second arm 28 of support 13, designed as a centering shoulder, is fixed in the support module 3 of housing 1 in a corresponding recess 29. The connector 30 that connects arms 21, 28 comprises a mounting hole 31 inserted into the centering shoulder in the region of arm 28 to support the rotary switch element 16.

The essentially L-shaped rotary switch element 16 has switch contacts 33 assigned to the long arm 32, which are designed as contact springs and cooperate with contract traces 34 in connector 30 of support 13. The switch contacts 33 extend into a recess 35 of arm 32 and are provided on their free end with a V-shaped angle 36, the point of which acts on the corresponding contact trace 34. An additional recess 37 is provided in arm 32 of the rotary switch element 16, parallel to the recess 35 for the switch contacts 33. A locating curve 60 is introduced to the end of the arm 32 of rotary switch element 16, which cooperates with the locating sleeve 23 of support 13.

The short arm 38 of the rotary switch element 16 contains a bearing pin 40, formed on the ends and on the opposite side, in which the end bearing pin 40 engages in a corresponding bearing hole in cover 2 of housing 1 and the opposite bearing pin 40 engages in the bearing hole 31 of support 13. An opening 39 is formed in the short arm 38, into which the foot 19 of switch lever 18 is inserted to pivot. For this purpose, foot 19 has axial pins 41 on the side that are mounted in corresponding holes 42 of arm 38.

The foot 19 of switch lever 18 also contains a V-shaped, locating curve 43 on its free end facing arm 21 of support 13, which cooperates with the upper locating sleeve 22, as well as an operating shoulder 44 that limits the locating curve 43 that acts on the sliding switch element 17. By cooperation of the locating sleeve 22 with the locating curve 43 of switch lever 18, it is held in a center position, so that the sliding switch element 17 assumes an equivalent position. The switch contacts 59 that cooperate with the contact traces 61 in arm 21 of support 13 are connected to sliding switch element 17.

A blind hole 46 with a rectangular cross section to accommodate the grip piece 20 is inserted in the longitudinal axis 45 of foot 19 of switch lever 18. The side walls of the blind hole 46 are formed in areas by two opposite clip arms 47 that engage in corresponding clip openings 48 of grip piece 20.

The grip piece 20 of the single switch 6, designed as a blinker switch 4, is provided with an additional switch 49 that serves as a push-button to control a computer system (not shown). For electrical contact transmission, a punched grid is integrated with the switch 49 in the grip piece 20, having exposed contact traces 50 in the end region inserted into foot 19. In the region of contact traces 50, the foot 19 has a perforation 58, penetrated by contact arms 51 of a contact unit 52, in which the contact arms 51, on the one hand, are connected to contact traces 50 of the punched grid of grip piece 20 and, on the other hand, pass through the recess 37 of the rotary switch element 16, and are connected to corresponding contact traces 53 of support 13.

Arms 54 are arranged parallel to contact arms 51 of the contact unit 52 for fastening of the contact unit on the foot 19 and on the rotary switch element 16. For this purpose, each arm 54 has a cylindrical shoulder 55 on the end, in which the opposite shoulders 55 on one end of the contact unit 52 engage in corresponding holes 56 of the rotary switch element 16, and the shoulders 55 on the other end of the contact unit 52 engage in corresponding elongated holes 57 of foot 19. The required freedom of movement of the switch lever 18 is guaranteed by this mounting of the contact unit 52 with simultaneously ensured transfer of the functions of switch 49.

After switch 49 is acted upon in any position of the switch lever 18 of the corresponding single switch 6, the transfer of the switch signal occurs via punched grids integrated in the grip piece 20 and its exposed contact traces 50 to one end of the contact arms 51 of the contact unit 52. The connection to the contact traces 53 of support 13, and thus to the terminal contacts 14 coupled to the contact traces 53, is produced via the contact arms 51. The terminal contacts 14 again contact the circuit board 7 connected to the electrical system. To transmit complex switching functions or for assignment of switching functions to the corresponding single switch 6, the punched grid of grip piece 20 can be coded, in which transmission occurs according to the coded signals.

LIST OF REFERENCE NUMBERS

1 Housing
2 Cover
3 Support module
4 Blinker switch
5 Wiper/washer switch
6 Single switch
7 Circuit board
8 Transmission element
9 Clip opening
10 Clip arm
11 Mount
12 Fastening device
13 Support
14 Terminal contact
15 Hole
16 Rotary switch element
17 Sliding switch element
18 Switch lever
19 Foot
20 Grip piece
21 Arm
22 Locating sleeve
23 Locating sleeve
24 Locating elements
25 Dome
26 Compression springs
27 Groove
28 Arm
29 Recess
30 Connector
31 Bearing hole
32 Arm
33 Switch contact
34 Contact trace
35 Recess
36 Angle
37 Recess
38 Arm
39 Opening
40 Bearing pin
41 Axial pin
42 Hole
43 Locating curve
44 Operating shoulder
45 Longitudinal axis
46 Blind hole
47 Clip arm
48 Clip opening
49 Switch
50 Contact trace
51 Contact arm
52 Contact unit
53 Contact trace
54 Arm
55 Shoulder
56 Hole
57 Elongated hole
58 Perforation
59 Switch contact
60 Locating curve
61 Contact trace

What is claimed is:

1. Steering column switch comprising:
a first switch having a pivotable switch lever which acts on terminal contacts by way of at least one switch element having switch contacts, wherein the switch lever is designed in first and second parts, said first part being a foot and said second part being a grip piece coupled to the foot, wherein the foot cooperate with the at least one switch element, and
a second switch having an end of said grip piece inserted into said foot, wherein said end of said grip has contact traces that act on terminal contacts by way of a contact unit.

2. Steering column switch according to claim 1, wherein the grip piece further includes said contact traces comprised of exposed regions of a punched grid integrated in the grip piece.

3. Steering column switch according to claim 2, wherein the contact unit has contact arms designed as leaf springs, in which one end of each of the contacts arms is connected to a corresponding one of the contact traces of the punched grid of said grip piece and the other end of said contact arm is connected to a corresponding contact trace of a Z-shaped support fixed to the housing.

4. Steering column switch according to claim 3, wherein the contact arms of the contact unit that act on the contact traces of said Z-shaped support pass through a recess of a rotary switch element of said first switch that is inserted into one arm of said Z-shape support.

5. Steering column switch according to claim 4, wherein the contact unit has arms that extend essentially parallel to said contact arms.

6. Steering column switch according to claim 5, wherein each of the contact unit arms has a cylindrical shoulder on an end, in which the shoulders on one end of the contact unit engage in a corresponding recess of said rotary switch element and wherein shoulders on an other end of the contact unit engage in a corresponding recess of said foot.

7. Steering column switch according to claim 6, wherein the recesses in said rotary switch element, in which the shoulders of said arm of said contact unit engage, are cylindrical holes.

8. Steering column switch according to claim 6, wherein the recesses in said foot of switch lever, in which the shoulders of said arm of said contact unit engage, are elongated holes.

9. Steering column switch comprising:
at least one switch having a pivotable switch lever which acts on terminal contacts by way of at least one switch element having switch contacts wherein the switch lever is designed in first and second parts, said first part being a foot and said second part being a grip piece coupled to the foot, wherein the foot cooperates with the at least one switch element, and wherein the foot of the switch lever is provided with two opposite clip arms that engage in corresponding clip openings of said grip piece.

10. Steering column switch according to claim 9, wherein said foot of the switch lever is swivel-mounted.

11. Steering column switch comprising:
at least one switch having a pivotable switch lever which acts on terminal contacts by way of at least one switch element having switch contacts wherein the switch lever is designed in first and second parts, said first part being a foot and said second part being a grip piece coupled to the foot, wherein the foot cooperates with the at least one switch element, and wherein said at least one switch element includes a rotary switch and the foot of the switch lever is mounted to pivot in an opening of an arm of the L-shaped rotary switch element, where the rotary switch element is inserted into one arm of a Z-shaped support fixed to the housing.

12. Steering column switch according to claim 11, wherein the arm of said rotary switch element is provided with an end locating curve that cooperates with a spring-loaded locating sleeve in an arm of the Z-shaped support.

13. Steering column switch according to claim 12, wherein the Z-shaped support has an additional spring-loaded locating sleeve that cooperates with a locating curve in a free end of the foot.

14. Steering column switch according to claim 12, wherein the arm of the Z-shaped support supports said at least one switch element.

15. Steering column switch according to claim 11, wherein switch contacts of the rotary switch element are designed as contact springs and act on corresponding contact traces of said Z-shaped support.

16. Steering column switch comprising:
at least one switch having a pivotable switch lever which acts on terminal contacts by way of at least one switch element having switch contacts wherein the switch lever is designed in first and second parts, said first part being a foot and said second part being a grip piece coupled to the foot, wherein the foot cooperates with the at least one switch element, and wherein the grip piece has a centering shoulder on an end inserted into said foot that engages in a corresponding centering hole of said foot.

* * * * *